May 20, 1952  L. F. BORDA ET AL  2,597,611
METHOD AND APPARATUS FOR TIRES OR LIKE REPAIR VULCANIZING
Filed March 23, 1946  2 SHEETS—SHEET 1

INVENTORS.
Laddy F. Borda &
Sheldon W. Bile
BY
William Cleland
ATTORNEY

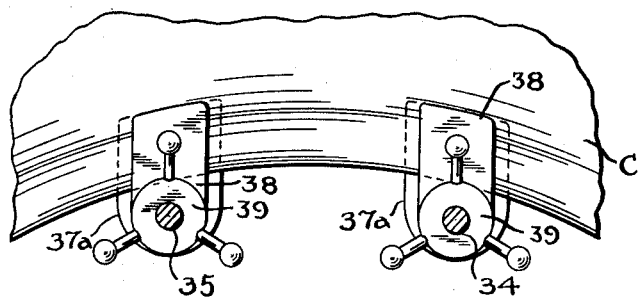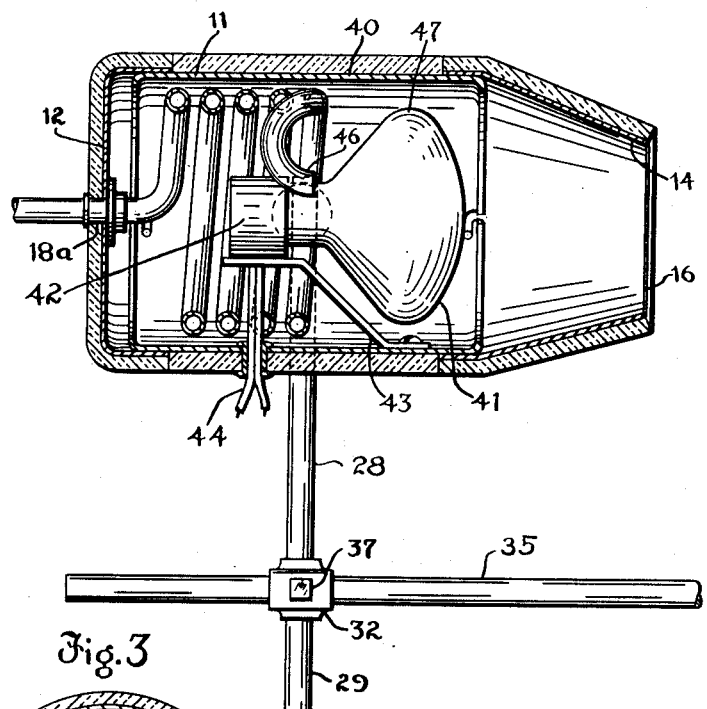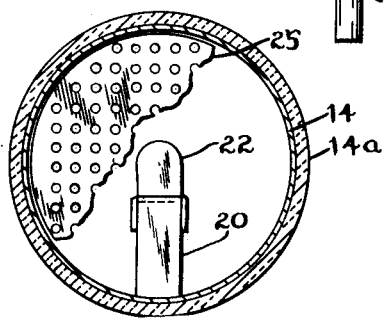

Patented May 20, 1952

2,597,611

UNITED STATES PATENT OFFICE 2,597,611

METHOD AND APPARATUS FOR TIRE OR LIKE REPAIR VULCANIZING

Laddy F. Borda, Akron, and Sheldon W. Bile, Barberton, Ohio

Application March 23, 1946, Serial No. 656,668

7 Claims. (Cl. 18—18)

This invention relates to a method and apparatus for vulcanizing areas of vulcanizable material, as for example a repaired portion on a pneumatic tire carcass.

An object of the invention is to provide a method and apparatus of the character described which obviates the use of the usual expensive and cumbersome vulcanizing equipment, such as vulcanizing presses, matrices, pressure plates and other devices heretofore required to be specially adapted to tire carcasses at least within a range of sizes thereof.

Another object of the invention is to provide apparatus of the character described adapted to be readily and quickly mountable in association with a tire carcass for a repair vulcanizing operation thereon, whether the tire is mounted on a rim or not, and by which the operation may be performed in any convenient location where sources of heat and of pressure-fluid supply means are available.

Another object of the invention is to provide apparatus of the character described which is of light weight compact construction, and thereby easy to handle for repair vulcanizing operations as well as convenient for storage purposes.

Another object of the invention is to provide apparatus of the character described, which is conveniently adjustable with reference to a repair area on a pneumatic tire carcass, for example, to control the heat of vulcanization and the rate thereof.

These and other objects of the invention will be manifest from the following brief description and the accompanying drawings.

Of the accompanying drawings:

Figure 3 is a cross-section, partly broken away, taken substantially on the line 3—3 of Figure 1.

Figure 4 is a cross-section taken substantially on the line 4—4 of Figure 1.

Figure 5 is a longitudinal cross-section, similar to Figure 1 but partly broken away, of a modified form of the invention.

Figure 1:
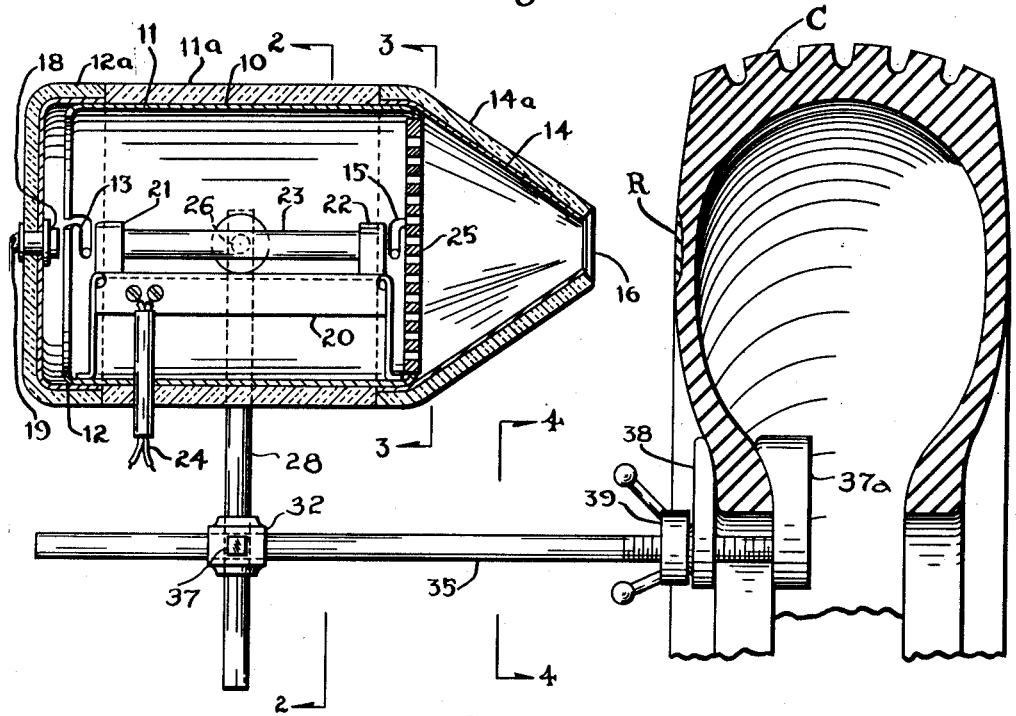
Figure 1 is a longitudinal cross-section through apparatus embodying the features of the invention, the same being illustrated clamped to a pneumatic tire carcass for a repair vulcanizing operation thereon.
Figure 2:
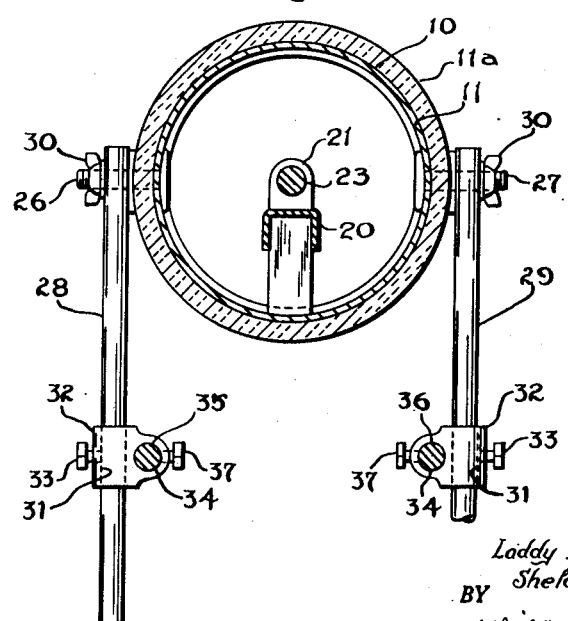
Figure 2 is a transverse cross-section through the apparatus taken substantially on the line 2—2 of Figure 1.

Referring particularly to Figures 1 to 4 of the drawings, the numeral 10 designates a hollow vulcanizing head or casing of metal or other suitable material, including a cylindrical body portion 11 having a closure member or cap 12 releasably secured over one end thereof as by means of a bayonet joint connection 13, and also including a nozzle 14 similarly releasably connected at 15 at the other end thereof. The nozzle 14 may be outwardly tapered as shown, and terminates in an outlet orifice 16 of desired size. Nozzle 14 is adapted to be interchangeable with similar nozzles having orifices 16 of varying sizes and shapes for use in accordance with the sizes and shapes of repair patches R on a pneumatic tire carcass C to be operated on. The parts 11, 12 and 14 of the vulcanizing head 10 are provided with suitable jackets 11a, 12a and 14a, respectively, of heat insulating material to retain heat provided in the head as will be subsequently described and to facilitate handling of the apparatus in use.

Provided in the cap 12 may be a fitting 18 for connecting thereto a conduit 19 for supplying pressure fluid, such as compressed air, to the interior of head 10 from a source of supply (not shown). Mounted within the tubular body 11 may be a bracket 20 having thereon spaced sockets 21 and 22 for releasably retaining an elongated electrical heating element 23, known as a glow bar, current to the element 23 being supplied through wiring indicated at 24 from a suitable source of electrical supply. To assure uniform and thorough heating of air in vulcanizing head 10 by the element 23, a perforated plate or baffle element 25 is provided at the nozzle end of the tubular body 11, the arrangement being such that the air from the fixture 18 is restrained in the head to a sufficient extent to assure uniform requisite heating thereof before it is forced outwardly of the casing through the nozzle orifice 16.

For fixedly supporting the vulcanizing head 10 in desired association with a tire carcass C for example, the tubular body 11 may have at diametrically opposite sides thereof outwardly projecting stems 26 and 27 which are pivotally received through vertically extending rods 28 and 29, the outer ends of these stems being threaded for receiving wing nuts 30, 30 for releasably fixing the head 10 in various angularly adjusted positions relative to said rods. These rods 28 and 29 are vertically slidably received through apertures 31 in joint members 32, 32, and held in various vertically adjusted positions relative thereto as by means of set screws 33.

Slidably received through apertures 34, 34 in joint members 32, to extend angularly of the rods 28 and 29, may be parallel spaced guide rods 35 and 36, the members 32 being releasably secured to said guide rods as by means of set screws 37, 37. The guide rods 35 and 36 extend generally coextensively with the axis of vulcanizing head 10, in the direction of the nozzle end thereof, and may be provided at said nozzle end with relatively fixed clamping plates 37a, 37a, and relatively movable clamping plates 38, 38 inwardly thereof, suitable nuts 39, 39 being threaded on the guide rods (Figure 1) for clamping the plates 38 toward plates 37a.

The latter arrangement is such that the plates 37a and 38 may be engaged with opposite edge portions of a tire bead of a tire C and clamped together by turning the nuts 39, and thereby through posts 28 and 29 to support head 10 in desired association with the side wall of the tire. The orifice end of the nozzle is adjusted relatively of the repair portion or area R of the tire by adjusting the rods 28 and 29 vertically in the joint members 32 and by adjusting said members 32 longitudinally of the guide rods 35 and 36, the distance of the orifice from said repair area being determined according to the vulcanizing temperature and pressure of the compressed air supplied from the head 10. The angularity of the head with reference to the repair area R is adjusted by means of wing nuts 30, so that the heated pressure fluid will flow in a stream substantially normal to the surface of the repair area.

For carrying out the method of the invention for repairing a damaged area of a tire carcass, by use of the apparatus described, the damaged area thereof is removed in known manner and the resulting cavity is filled with a patch of unvulcanized rubber, as indicated at R in Figure 1. Next, the carcass C is placed upon or against any suitable support and the vulcanizing head or casing 10 is mounted on the tire as previously described, through the clamping plates 37a and 38, the distance of the end of the nozzle 16 from patch R and the relative angle of the head being adjusted by means of the set screws 33 and 34 and wing nuts 30, respectively. Thus compressed air from the fitting 18 upon entering the casing 10 will be heated by the heating element 23 to desired vulcanizing temperature. Thus the heated air, upon passing through the nozzle orifice 16 in a continuous stream of uniform flow, is concentrated on the entire area of the filling R, and is under requisite temperature and pressure whereby the filling may be completely vulcanized in a very short period of time, such as ten or fifteen minutes, or in a shorter or longer period of time according to the conditions of temperature and pressure, the size of the orifice 16, and the distance thereof from the repair patch area. During the vulcanizing period the pressure of the pressure fluid tends to hold the patch R in place while the rubber solvent thereof is evaporating. It has been found that under conditions similar to those described above the repair patch will be effectively and uniformly vulcanized.

In the initial stage of application of the vulcanizing heat of the pressure fluid, that is while the rubber of the patch R is soft and pliable, a knife or other flat implement may be inserted between the head 10 and the tire to remove any excess rubber stock and to smooth over the repair area. This operation obviates the necessity of buffing over the repair area after vulcanizing. Similarly, while the rubber is in soft pliable state, letters or design configurations may be formed by use of implements having corresponding letter or design forming impressions thereon.

Referring to Figure 5, there is illustrated a modified form of vulcanizing head or casing 40, similar to the casing 10, like parts being given like numerals except as otherwise noted. In place of the glow bar 23, however, a heating element such as an infrared heat lamp 41 is removably secured in a socket 42 mounted on a bracket 43 in the casing 11, electrical current for the same being supplied through conduit means 44 from a suitable source of electrical supply. Extending inwardly from the air fixture 18a in closure cap 12a, may be a coil 45 for preheating the air before leaving an outlet end thereof, at a point indicated at 46 adjacent a rear conical face 47 provided on the lamp 41. Thus the heating of the compressed air is complete and substantially uniform before leaving head 40 through the orifice 16 thereof. This modified form of the invention is otherwise operated and used as previously described.

Both forms of the invention described above are adapted to be utilized in ways other than as described, and for vulcanizing articles other than tires. The clamping plates 37a and 38 are adapted to be clamped to a table top, as an example, to present heated air to casing 10 in desired association with a repair area of a tire or other article.

It will be readily understood that the apparatus described is adapted to be used in any desired location without requiring additional equipment other than sources of compressed air and electrical supply. For example, the apparatus may be quickly prepared for a rubber vulcanizing operation in relatively small space in service stations, garages or the like, and pneumatic tire carcasses may be so operated upon whether they are mounted on a rim or not.

Modifications of the invention may be resorted to without departing from the spirit thereof or the scope of the appended claims.

What is claimed is:

1. Apparatus for treating an area of rubber or like thermo-plastic material, comprising a casing, a heating element in said casing, a pressure fluid inlet means in said casing adapted to be connected to a source of pressure fluid, and a nozzle on said casing, said nozzle having an opening end for emitting heated pressure fluid therefrom in a uniform stream, and means adapted for mounting said casing in association with the work to direct said stream directly and substantially unconfinedly onto the material to be treated, said inlet means including a coil exposed to said heating element for pre-heating the pressure fluid.

2. Apparatus for treating an area of rubber or like plastic material on a pneumatic tire having the usual spaced side-wall portions terminating in annular bead portions, comprising a heating member for concentrating a stream of heated pressure fluid, heating means in said heating member for heating pressure fluid supplied thereto, a support for said member, and mounting means for mounting said support in association with the tire to maintain said heating member at a fixed distance from the area of the tire to be treated and adapted to have the heated pressure fluid directed onto the area being treated, said mounting means including at least one clamp releasably attachable over a tire bead, and means selectively operable for shifting said heating member on said support to be shiftable radially and axially of a tire on which said mounting means is clamped.

3. Apparatus for treating an area of rubber or like plastic material on a pneumatic tire having the usual spaced side-wall portions terminating in annular bead portions, comprising a heating member for concentrating a stream of heated pressure fluid, heating means in said heating member for heating pressure fluid supplied thereto, a support for said heating member, and mounting means clampingly engageable over a bead of a said tire to support said tire whereby direct heated pressure fluid may be directed onto the area being treated, and means selectively operable for shifting said heating member on said support to be shiftable radially and axially of a tire on which said mounting means is clamped.

4. A method of vulcanizing a single localized area of vulcanizable material onto a larger area of an article without subjecting the remaining portions of said article to vulcanizing heat, which comprises heating pressure fluid to vulcanizing temperatures of the plastic material, and continuously concentrating a single stream of said pressure fluid at said vulcanizing temperature directly onto said single localized area of plastic material until the same is vulcanized to the article, said stream of heated pressure fluid being laterally unconfined immediately adjacent the area being vulcanized.

5. A method of vulcanizing a single localized area of vulcanizably compatible material onto a larger area of an article without subjecting the remaining portions of said article to vulcanizing heat which comprises heating pressure fluid from a continuous source of supply thereof to vulcanizing temperature and concentrating a substantially uniform single stream of said heated pressure fluid at said vulcanizing temperature through an orifice having a flow area approximating said single area of vulcanizable material directly onto the same until it is vulcanized, said stream of heated pressure fluid being laterally unconfined in a space between said orifice and said vulcanizable material.

6. A method of vulcanizing a single localized area of vulcanizable elastomer onto a pneumatic tire of vulcanizably compatible material without subjecting the remaining portions of said article to vulcanizing heat, which comprises heating pressure fluid from a continuous source of supply thereof to vulcanizing temperature and concentrating a single substantially uniform stream of said heated pressure fluid at said vulcanizing temperature through an orifice having a flow area approximating said single area of vulcanizable material directly onto the same until it is vulcanized, said pressure being directed to impinge upon said area at an angle substantially normal thereto and said orifice being spaced from the same whereby the pressure fluid is laterally unconfined in said space.

7. Apparatus for vulcanizing a localized area of vulcanizable material onto a larger area of an article of vulcanizably compatible material, comprising a hollow casing, an attachment to said casing for continuously supplying air under substantial pressure to the interior thereof, a heater within said casing for heating said air to vulcanizing temperature, a nozzle on said casing providing an outlet orifice from the casing of substantial flow area at the outer end thereof through which the heated pressurized air is emitted in a single stream having substantially said flow area, and mounting means for adjustably supporting said casing and an article to be vulcanized with said outer end of said nozzle at a predetermined distance from said area of vulcanizable material on the article, the space between said outer end of the nozzle and the article being substantially free and unobstructed whereby said stream is directed from the nozzle substantially laterally unconfinedly onto the vulcanizable material on the article.

LADDY F. BORDA.
SHELDON W. BILE.

REFERENCES CITED

The following references are of record in the file of this patent:

UNITED STATES PATENTS

| Number | Name | Date |
|---|---|---|
| 1,543,890 | Williams | June 30, 1925 |
| 1,566,165 | O'Brien | Dec. 15, 1925 |
| 1,627,785 | Krall | May 10, 1927 |
| 1,716,580 | Duhamel | June 11, 1929 |
| 1,950,626 | Parks et al. | Mar. 13, 1934 |
| 2,110,224 | Havens | Mar. 8, 1938 |
| 2,129,571 | Driscoll | Sept. 6, 1938 |
| 2,193,119 | Bailey | Mar. 12, 1940 |
| 2,212,694 | McMurray | Aug. 27, 1940 |
| 2,295,502 | Lamb | Sept. 8, 1942 |
| 2,317,890 | Dawson | Apr. 27, 1943 |
| 2,357,960 | Kuster et al. | Sept. 12, 1944 |
| 2,364,167 | Scott | Dec. 5, 1944 |
| 2,385,628 | Larkin et al. | Sept. 25, 1945 |

FOREIGN PATENTS

| Number | Country | Date |
|---|---|---|
| 385,857 | Great Britain | Jan. 5, 1933 |